United States Patent [19]
Isaji et al.

[11] Patent Number: 5,651,564
[45] Date of Patent: Jul. 29, 1997

[54] SEAT BELT TENSIONING DEVICE

[75] Inventors: Kazuyoshi Isaji, Kariya; Yutaka Ohasi, Handa; Mutsumasa Koujiya, Toyota; Shinichi Iwai, Gifu; Toshihiro Takei, Okazaki, all of Japan

[73] Assignee: Nippondenso Co., Ltd., Kariya, Japan

[21] Appl. No.: 451,154

[22] Filed: May 26, 1995

[30] Foreign Application Priority Data

May 31, 1994 [JP] Japan ................................. 6-118958
Feb. 10, 1995 [JP] Japan ................................. 7-046360

[51] Int. Cl.⁶ ........................................ B60R 22/18
[52] U.S. Cl. ................................ 280/806; 297/480
[58] Field of Search ........................ 280/806, 801.1; 297/480, 416, 419; 180/282, 268; 242/382.4, 382.2, 383, 383.2

[56] References Cited

U.S. PATENT DOCUMENTS

| 2,845,234 | 7/1958 | Cushman et al. ............... 297/490 |
| 4,705,296 | 11/1987 | Andersson et al. ............. 280/806 |
| 4,729,524 | 3/1988 | Sefert et al. ................. 297/480 X |
| 5,039,127 | 8/1991 | Fohl ........................... 280/806 |
| 5,367,717 | 11/1994 | Hishou et al. ................ 280/806 X |

FOREIGN PATENT DOCUMENTS

| 0404989 | 1/1991 | European Pat. Off. ............ 208/806 |
| 3707056 | 9/1988 | Germany ....................... 280/806 |
| 5345557 | 12/1993 | Japan . | |
| 2247925 | 3/1992 | United Kingdom ............... 280/806 |

Primary Examiner—Christopher P. Ellis
Attorney, Agent, or Firm—Cushman, Darby & Cushman IP Group of Pillsbury Madison & Sutro LLP

[57] ABSTRACT

A tensioning device is provided to realize compactness and simplification of device structure and causes mountability to be improved. A tensioning mechanism to rapidly tension one end of an interconnecting member when deceleration of a vehicle is applied, a reversing-prevention hook plate supported rotatably freely on an arm plate, a buckle joined freely rotatably at a position most proximate to a seat belt in a direction of tension action of the seat belt within a plate surface of the reversing-prevention hook plate, and a reversing-prevention claw to restrict reverse rotation of the reversing-prevention hook plate after the interconnecting member has been pulled out are provided, and a base end of the foregoing arm plate is joined freely rotatably to a frame member. During tensioning operation, the arm plate rotates in the direction of tensioning of the interconnecting member, and along with this the reversing-prevention hook plate rotates in a direction opposite the direction of rotation of the arm plate while pulling out the interconnecting member.

11 Claims, 8 Drawing Sheets

SEAT BELT TENSIONING DEVICE

CROSS REFERENCE TO RELATED APPLICATIONS

This application is based upon and claims priority from Japanese Patent Application No. Hei 6-118958 filed May 31, 1994 and Japanese Patent Application No. Hei 7-46360 filed Feb. 10, 1995, with the contents of each document being incorporated herein by reference.

BACKGROUND OF THE INVENTION

1. Field of the Invention

The present invention relates to a tensioning device to tension a seat belt at the time of sudden deceleration of a vehicle, and more particularly to a tensioning device of compact structure.

2. Description of the Related Art

A tensioning device to rapidly tension a seat belt suspending member being a buckle or the like and tension a seat belt at the time of sudden vehicle deceleration is frequently provided with a reversing-prevention mechanism to prevent withdrawal of the belt again so as to reliably restrain a rider body in a tensioned state. A structure such as disclosed in for example Japanese Patent Application Laid-open No. Hei 5-345557 has been proposed as such a reversing-prevention mechanism.

However, according to the foregoing structure described in the Patent Application Laid-open, a moving member of rod configuration joined to the buckle and constituting a portion of the reversing-prevention mechanism moves linearly in a direction opposite the direction of tension action of the seat belt, and so it is necessary to assure a large movement space of the foregoing moving member during seat belt tensioning, and interference with other members surrounding the device becomes a problem.

SUMMARY OF THE INVENTION

It is an object of the present invention to provide a seat belt tensioning device of good mountability which achieved simplification and compactness in device structure centering in particular on a reversing-prevention mechanism.

A first preferred mode according to the present invention includes a tensioning means 30 to rapidly tension one end of an interconnecting member 209 when sudden deceleration of a vehicle is exerted, a plate body 203 joined to another end of the interconnecting member 209 and supported freely rotatably on base bodies 20 and 202, a seat belt suspension means joined on a plate surface of the plate body 203 at a position most proximate to the seat belt in the direction of tension action of the seat belt, and a reversing-prevention means 208 to restrict reverse rotation of the plate body 203 after reeling out the interconnecting member 209.

A second preferred mode according to the present invention further disposes arm members 2 and 102 between the base body 2 and plate bodies 3 and 103 and joins base ends of the arm members 2 and 102 freely rotatably to the base body 20, together with supporting the plate bodies 3 and 103 on tips of the arm members 2 and 102 and rotating the arm members 2 and 102 to a direction of tension of the interconnecting member along with being constituted so that the as to rotate the plate bodies 3 and 103 rotate in a direction different and opposite to the direction of rotation of the arm members 2 and 102 while reeling out interconnecting members 9 and 109.

In a third preferred mode according to the present invention, the reversing-prevention means is structured by means of hook portions 3c, 103c, and 203c formed on an arc-shaped outer periphery of the plate bodies 3, 103, and 203, and reversing-prevention claws 8, 108, and 208 have been claw portions 8a, 108a, and 208 to engage the hook portions 3c, 103c, and 203c during reverse rotation.

In a fourth preferred mode according to the present invention, a stopper tab 207 spring-urged at the back and placed in an advancing position is disposed on the plate body with the other end 209a of the interconnecting member 209 joined thereto, and the reversing-prevention claw 208 with the claw portion 208a caused to be engaged with the hook portion 203c is caused to contact the stopper tab 207 to block movement to an engagement-release position.

In a fifth preferred mode according to the present invention, an operating portion 208b is formed on a portion of the reversing-prevention claw 208, and the reversing-prevention claw 208 is made movable to a position whereat engagement of the claw portion 208a thereof and the hook portion 203c is released by means of the operating portion 208b.

According to the foregoing structure, when the interconnecting member is tensioned by means of the tensioning means, the plate body rotates while reeling out the interconnecting member. Accompanying the rotation of this plate body, the seat belt suspension member joined to the plate body turns so as to move away from the position closest to the seat belt in the direction of tension action of the seat belt, and as a result of this, the seat belt is pre-tensioned. Drawing-out of the seat belt accompanying forward movement of the rider body after pre-tensioning is avoided by means of reverse rotation of the plate body being restricted by means of the reversing-prevention means. According to the present structure, the reversing-prevention mechanism is realized by means of the rotating plate body, and so the advancing moving member of rod configuration according to the conventional device is unnecessary, and no need exists to assure large space surrounding the device.

Further, the plate body rotates in the direction opposite the direction of rotation of the arm member while reeling out the interconnecting member simultaneously to rotation of the arm member toward the direction of tension, and so the seat belt suspension member joined to the plate body moves substantially linearly so as to move away from the position closest to the seat belt in the direction of tension action of the seat belt, and smooth belt pre-tensioning is possible.

DETAILED DESCRIPTION OF THE PREFERRED EMBODIMENTS (First Embodiment)

A structure according to the present invention will be described hereinafter with reference to the drawings.

Figure 1:
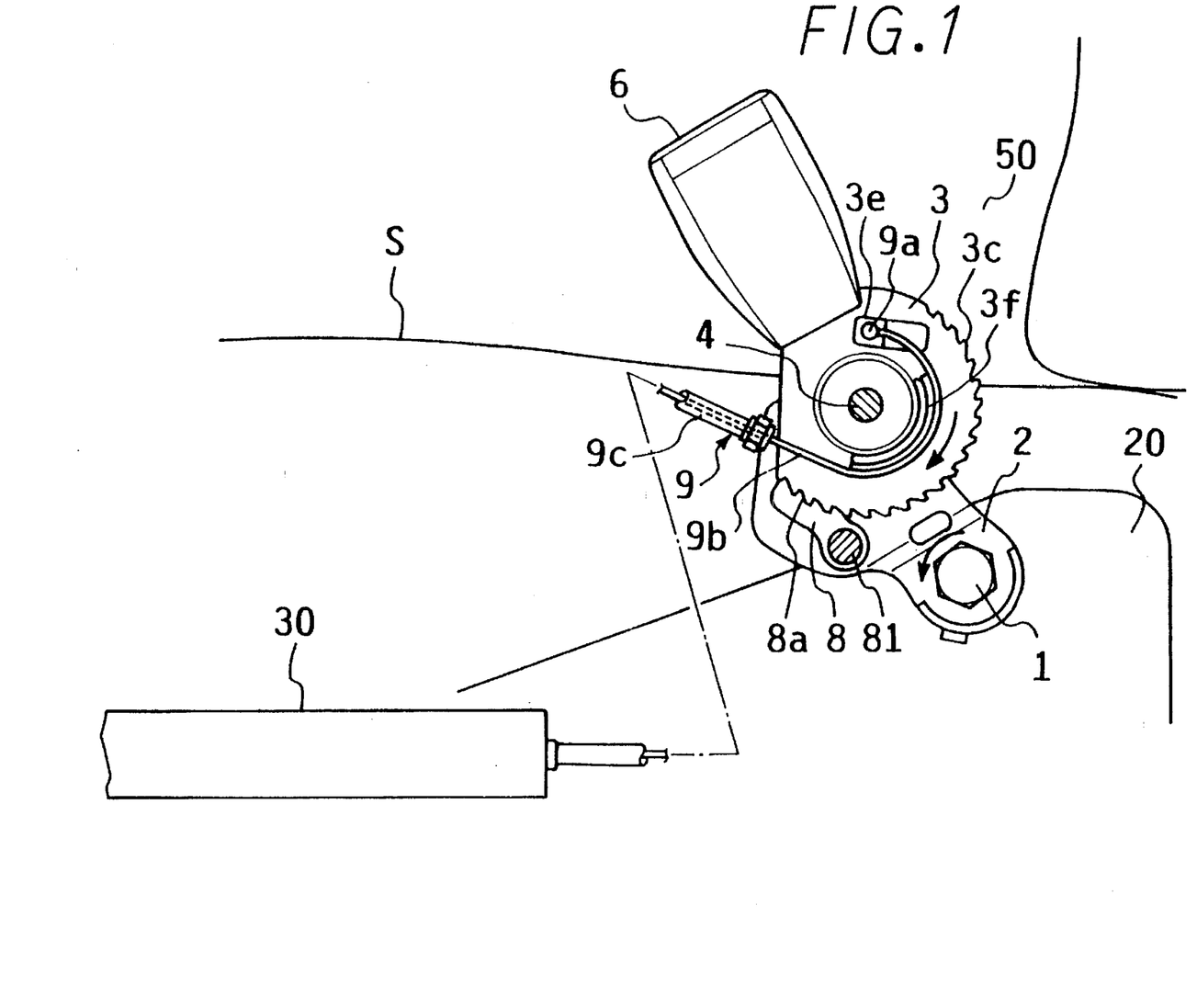
FIG. 1 is a front view of a reversing-prevention mechanism of a tensioning device according to a first embodiment of the present invention.
Figure 2:
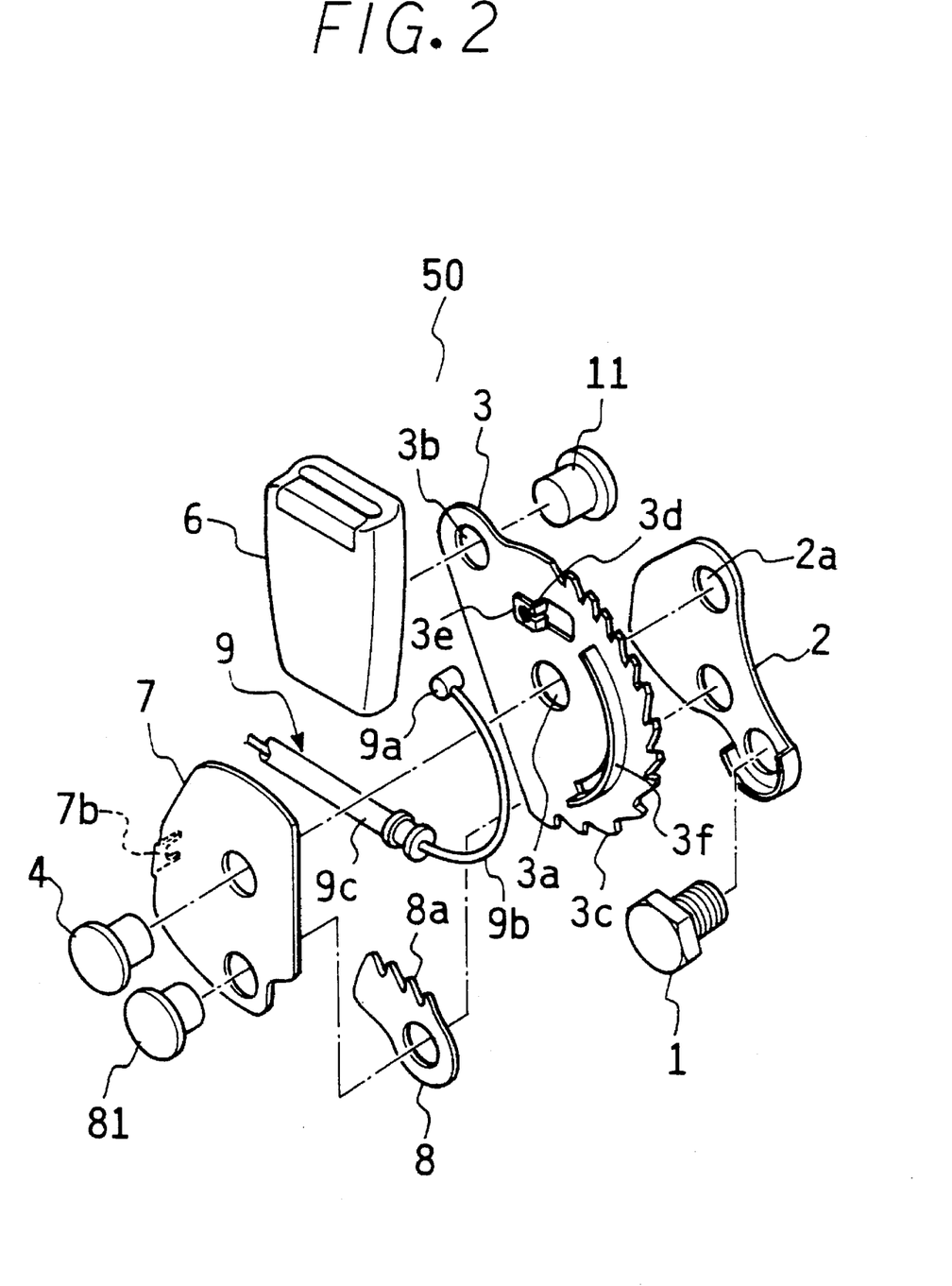
FIG. 2 is an exploded perspective view of a reversing-prevention mechanism of a tensioning device.

FIG. 1 is a entire structural view of a seat belt pretensioning device according to the present invention, and indicates a state of installation on a seat of a vehicle. FIG. 2 indicates three-dimensionally an assembly structure of a reversing-prevention mechanism 50 in FIG. 1. Furthermore, in order to facilitate understanding of the internal structure of the reversing-prevention mechanism 50, FIG. 1 indicates a state wherein a reversing-prevention hook plate support member positioned at the forwardmost side has been detached.

In FIG. 1, the reversing-prevention mechanism 50 is installed by means of a bolt 1 on a frame member 20 as a base body structuring a vehicle seat S. An arm plate 2 is installed freely rotatably at the center of the bolt 1 axis by means of the bolt 1. A reversing-prevention hook plate 3 having a plurality of hook portions 3c at an outer periphery thereof is installed by means of a rivet 4 at a center portion 3a freely rotatably on one end portion 2a of the arm plate 2 (FIG. 2) so as to be overlapping in the direction of plate thickness. A seat belt buckle 6 is installed freely rotatably by means of a rivet 11 on one end portion 3b of an outer periphery of the reversing-prevention hook plate 3. The reversing-prevention hook plate support member is provided on the fore side of the reversing-prevention hook plate 3 in a configuration so as to sandwich the reversing-prevention hook plate 3 together with the arm plate 2 Via the rivet 4.

A reversing-prevention claw 8 is further disposed between the arm plate 2 and reversing-prevention hook plate support member by means of a rivet 81 freely rotatably at the center of the rivet 81 axis, and a claw portion 8a thereof is mated with the hook portions 3c of the foregoing reversing-prevention hook plate 3. A protruding portion 3e having a hole portion 3d is provided at the reversing-prevention hook plate 3, and a tip portion 9a of an interconnecting member 9 connecting a tensioning mechanism 30 which will be described later is engaged with the foregoing hole portion 3d. Additionally, a guide portion 3f which winds an inner wire 9b of the interconnecting member 9 in accompaniment to rotation of the reversing-prevention hook plate 3 is disposed on the reversing-prevention hook plate 3. A supporting portion to support a flexible outer case 9c of the interconnecting member 9 is provided on the reversing-prevention hook plate support member.

A mode of operation will be described hereinafter.

In an initial state wherein the tensioning mechanism 30 is not operating, as shown in FIG. 1, the arm plate 2 faces diagonally upwardly, and the seat belt buckle 6 is in an untensioned state. In this state, if more than a predetermined deceleration inertial force acts upon the vehicle and the inner wire 9b is pulled by the tensioning mechanism 30 to be described later, the protruding portion 3e having the hole portion 3d with which the tip portion 9a is engaged rotates clockwise with the axis of the rivet 4 as the rotational center (arrow in FIG. 1), and the reversing-prevention hook plate 3 integral with this also begins to rotate clockwise. In accompaniment with the clockwise rotation of the reversing-prevention hook plate 3, the claw portion 8a of the reversing-prevention claw 8 supported freely rotatably between the arm plate 2 and reversing-prevention hook plate support member with the rivet 81 as a center resists the urging force of an elastic member with the rivet 81 as the center and repeats fluctuation such as the engagement and engagement release with the hook portions 3c of the reversing-prevention hook plate 3 while rocking. Additionally, simultaneously with this clockwise rotation of the reversing-prevention hook plate 3, the arm plate 2 begins to rotate counterclockwise with the bolt 1 as the rotational center (arrow in FIG. 1).

Figure 3:
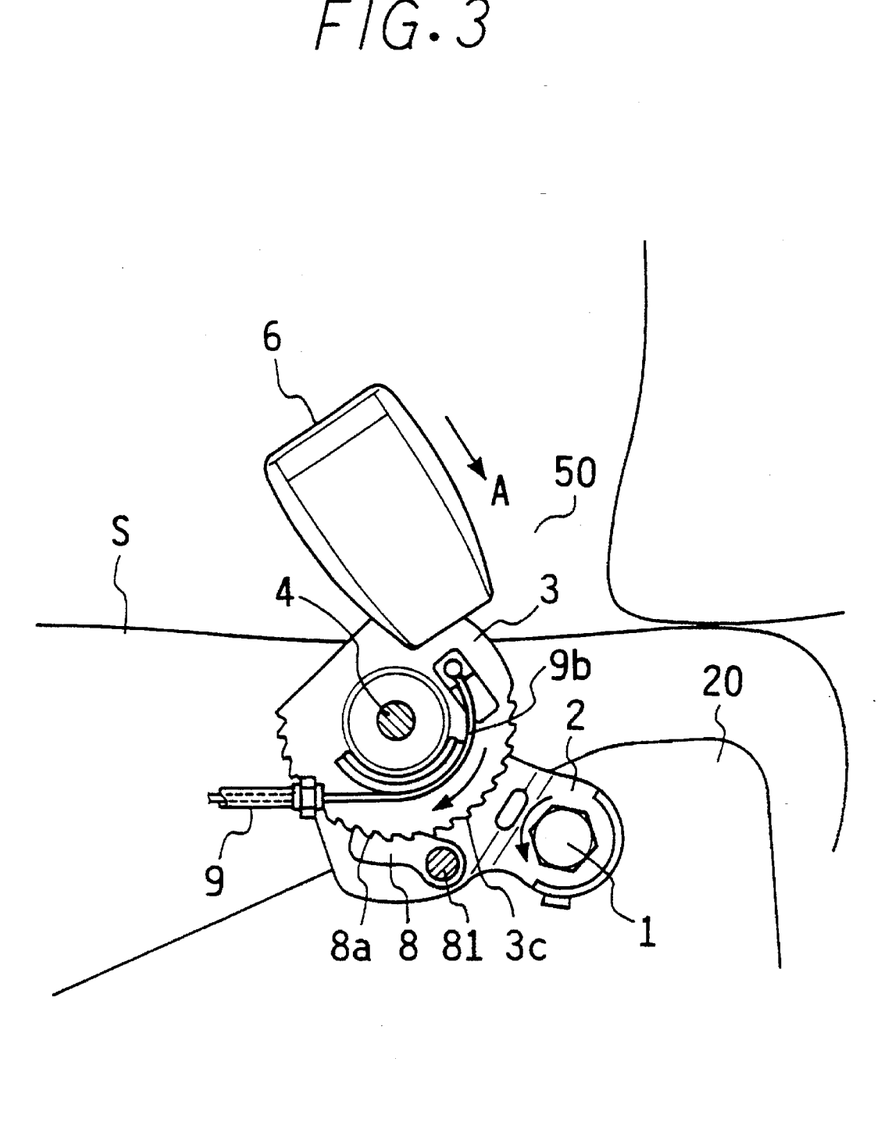
FIG. 3 is a front view indicating the operation of a reversing-prevention mechanism of a tensioning device.
Figure 4:
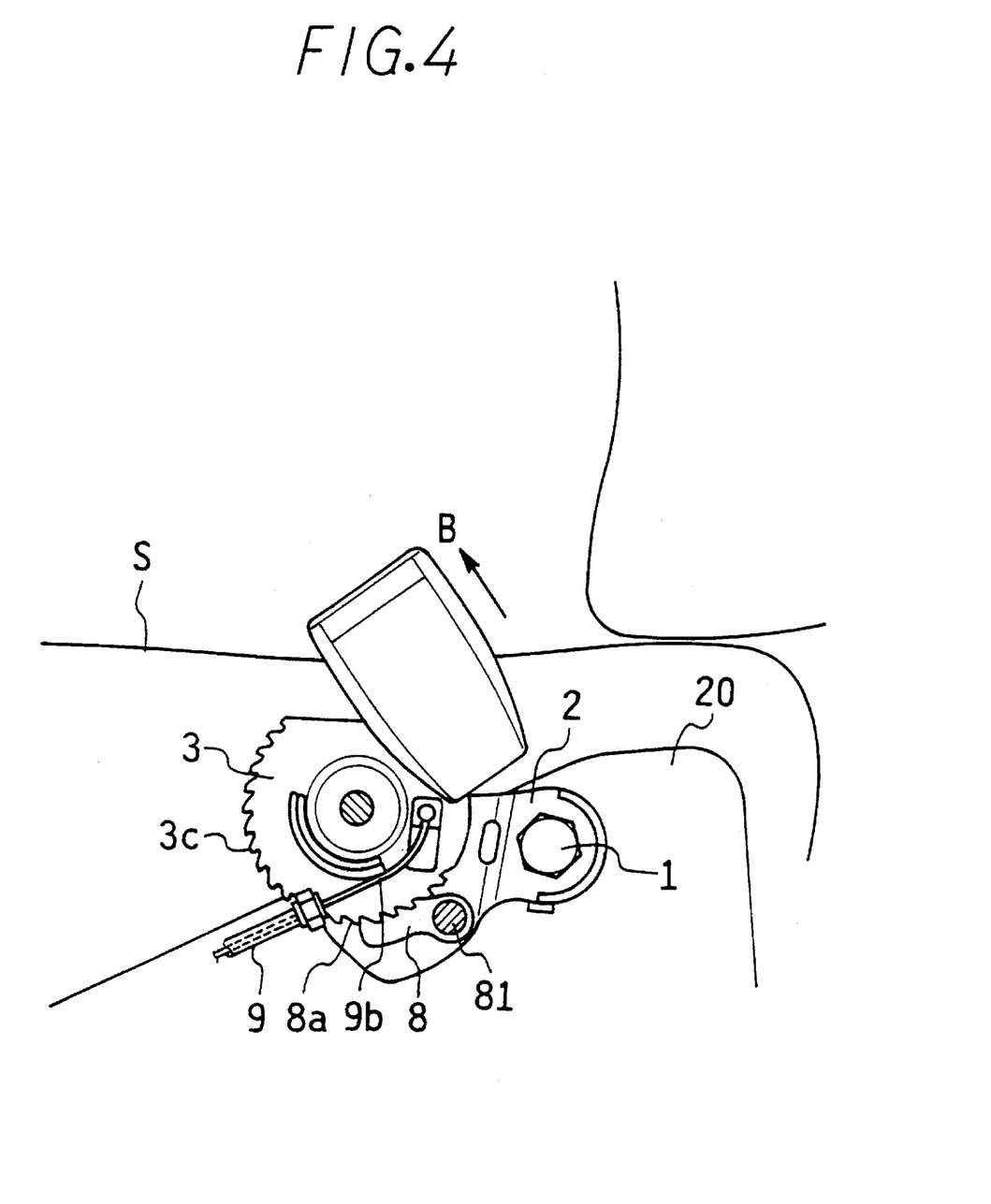
FIG. 4 is a front view indicating the operation of a reversing-prevention mechanism of a tensioning device.

By means of the counterclockwise rotation of the arm plate 2, the foregoing reversing-prevention hook plate support member and reversing-prevention hook plate 3 installed on the other end portion 2a by means of the rivet 4 also rotate counterclockwise with the bolt 1 as the center (FIG. 3). By means of the clockwise rotation of the reversing-prevention hook plate 3 and the start of the counterclockwise rotation of the arm plate 2, the seat belt buckle 6 concluded at one end portion 3b of the reversing-prevention hook plate 3 begins to move in the direction of arrow A in FIG. 3. If the inner wire 9b is further pulled by means of tensioning mechanism 30, the reversing-prevention hook plate 3 rotates greatly clockwise and the arm plate 2 rotates greatly counterclockwise, the seat belt buckle 6 further moves greatly and substantially linearly in the direction of arrow A (FIG. 4). Even if the tensioning of the inner wire 9b by means of the tensioning mechanism 30 is completed and thereafter the seat belt buckle 6 attempts to return in the direction of arrow B due to load applied to the seat belt by means of forward movement of the rider, the reversing-prevention hook plate 3 is engaged with the claw portion 8b of the reversing-prevention claw 8 at the hook portion 3c, and so counterclockwise rotation of the reversing-prevention hook plate 3 and clockwise rotation of the arm plate 2 are blocked and the attempt of the seat belt buckle 6 to return in the direction of arrow B in FIG. 4 is blocked.

The structure of the tensioning mechanism 30 will be described hereinafter.

Figure 5:
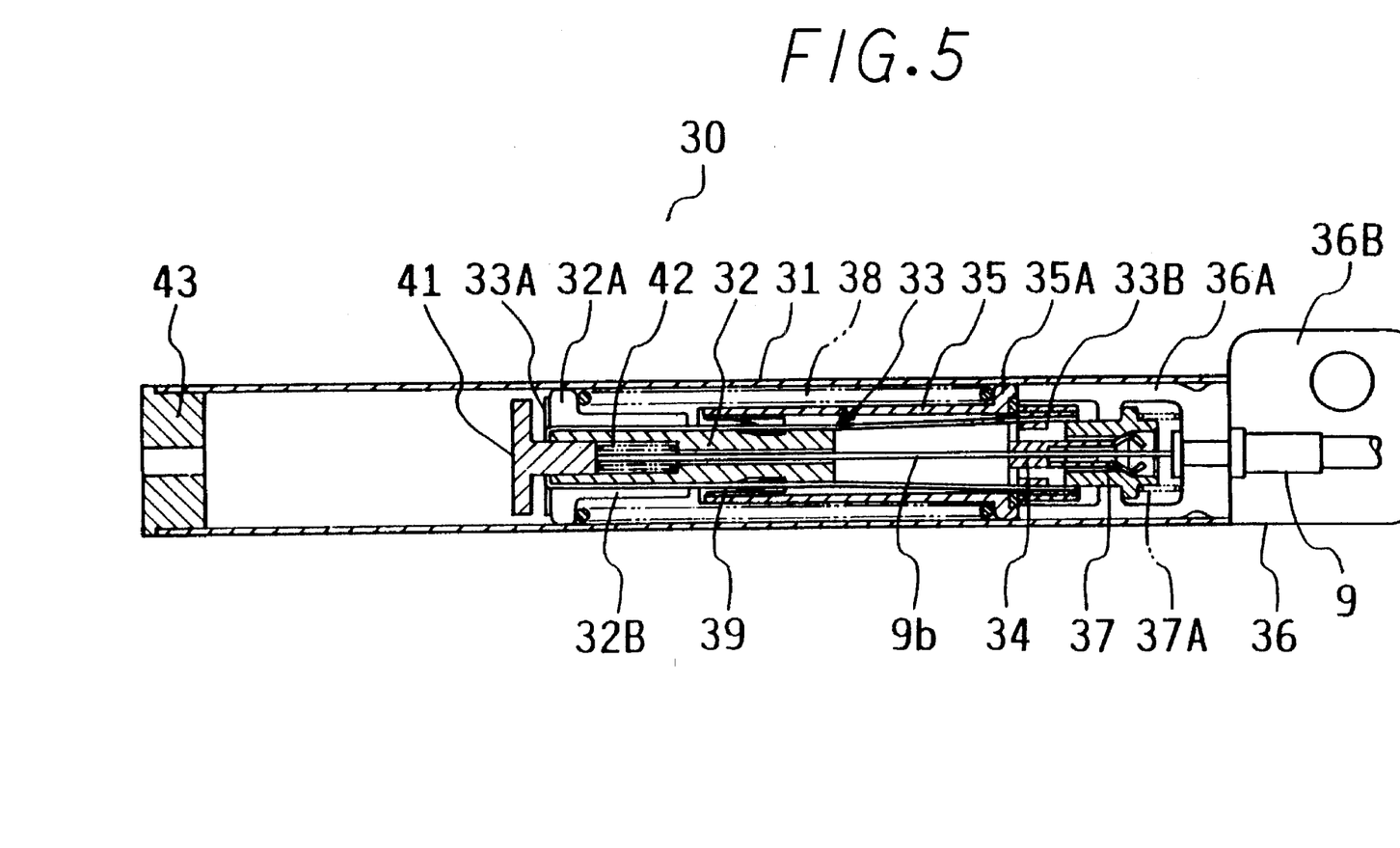
FIG. 5 is an overall sectional view of a reversing-prevention mechanism of a tensioning device.

In FIG. 5, a casing 31 of a tensioning portion is a cylindrical body of metal, and is disposed longitudinally (the lateral direction of the drawing) fixed on a vehicle floor not illustrated. A front-end (left edge of the drawing) opening thereof is closed by a cap 43 provided with an air hole, and a main body portion 36A of cylindrical configuration of a housing member 36 is press-fitted and fixed in a rear-end opening. This main body portion is structured of a pair of butted semicylindrical bodies divided along an axial line, and a rectangular interconnecting portion 36B protruding to the outside of the casing 31 is formed on one semicylindrical body.

A main spring guide member 32 and holder 35 as a material body are disposed at a longitudinal position within the foregoing closed casing 31. The main spring guide member 32 is a metal cylindrical body having a through-hole with the front half having a large diameter and the rear half having a small diameter; a rectangular grooves 32B extending axially in two upper and lower locations are formed on a spring retaining portion 32A of flange configuration formed on an outer periphery thereof, and hereat is disposed a plate spring 33 which gradually widens rearwardly at opposing intervals. This plate spring 33 is formed by bending a belt plate into a substantially square-C configuration, and a base end portion thereof becomes a flange plate 33A along an end face configuration of the main spring guide member 32. Accordingly, the two leg portions of the plate spring 33 pass within the upper and lower grooves 32B of the main spring guide portion 32 to extend rearwardly, and stopper tabs 33B are crimped and fixed at respective tips.

The holder 35 is a metal cylindrical body of large diameter which can house a rear-half portion of the foregoing main spring guide portion 32, and a spring retaining portion 35A of flange configuration is formed on entire periphery of a rear-end outer periphery thereof. A metal ring is fitted into this spring retaining portion 35A along the opening perimeter, and an end surface of the stopper tab 33B of the above-mentioned plate spring tip inserted through the holder 35 touches this. A front end of this holder 354 touches a receiving ring 39 mounted on an outer periphery of the main spring guide member 32, and a rear end touches an end surface of the foregoing housing member 36. The receiving ring 39 causes the plate spring 39 to be inserted through the tube interior, and causes push protrusions to the tube interior formed at two locations on peripheral walls thereof the engages with retaining grooves formed on an outer periphery of the main spring guide member 32 and be fixed.

A main coil spring 38 is disposed in a compressed state squeezed between the spring retaining portion 35A of the foregoing holder 35 and the spring retaining portion 32A of the foregoing main spring guide member 32, and strong expansion spring force of the main coil spring 38 is received by the flange plate 33A and stopper tab 33B of the plate spring 33 touching the end surfaces of the above-described spring retaining members 32 and 35.

An outer peripheral surface of a retainer 37 of block configuration touches the two tips of the foregoing plate spring 33 from inwardly; the retainer 37 is disposed longitudinally slidably in an inner space of the housing member 36, and is urged forwardly by means of a coil spring 37A disposed between it and the rear-end inner wall of the housing member 36. The inner wire 9b of the interconnecting member 9 extends forwardly through a through-hole provided in the center of the retainer 37; one end the wire 9b reaches the above-described reversing-prevention mechanism 50 (FIG. 1), and the other end passes through the tube interior of the main spring guide member 32 and is fixed at a center protrusion of a retaining plate of circular configuration positioned at the front thereof with a predetermined gap interposed therebetween.

An auxiliary coil spring 42 of weak spring force is disposed between the center protrusion end surface of the retaining plate 41 and an inner peripheral stepped surface of the main spring guide member 32, and the integrated front and rear main spring guide member 32 and holder 35 are supported facing forwardly by means of the plate spring 33.

Additionally, a positioning member 34 is mounted at an intermediate position of the inner wire 9b, and a tip-curved portion of a flexible claw portion extending rearwardly from a vertical position is retained on a stepped surface of the through-hole of the retainer 37. By means of this, the retaining plate 41 of the inner wire 9b tip is positioned at a predetermined position.

In the tensioning portion of this structure, when forward inertial force due to sudden deceleration of the vehicle acts upon the main spring guide member 32 and holder 35, both move forwardly while compressing the auxiliary coil spring 42, and the inner side surface of the plate spring tip moves away from the outer peripheral surface of the retainer 37. The moment due to the load from the main coil spring 38 acts on the stopper tab 33B, and as a result of this, the plate spring tip bends and tilts inwardly, and the engagement of the end surface of the stopper tab 33B and the metal ring is released. Accordingly, the main coil spring 38 extends and deforms with large spring force, and along with this the main spring guide member 32 contacts the retaining plate 41 and rapidly extends forwardly. Simultaneously, the inner wire 9b is also pulled forwardly by large force, and the above-described tensioning of the seat belt buckle 6 is performed.

In a tensioning mechanism according to the present embodiment, a squeezing member to support a main coil spring in a compressed state and a squeezing release member to release the main coil spring from the squeezing member and cause it to expand were structured of a plate spring and a stopper of a tip thereof, a tilted surface portion of a holder, and a retainer, but it is also acceptable to adopt a squeezing release member employing a lever or the like. Additionally, a structure was used whereby an auxiliary coil spring for trigger use is housed within an inner diameter portion of a material body, but disposition between the material body and the cap or between the material body and the casing is also acceptable.

(Second Embodiment)

Another embodiment of a reversing-prevention mechanism will be described hereinafter with reference to FIGS. 6 and 7.

The structure of a reversing-prevention mechanism 100 which will be described hereinafter is substantially similar to the structure of the above-described reversing-prevention mechanism 50, and the assembly relationship of the respective structural components is also as shown in FIG. 2.

Figure 6:
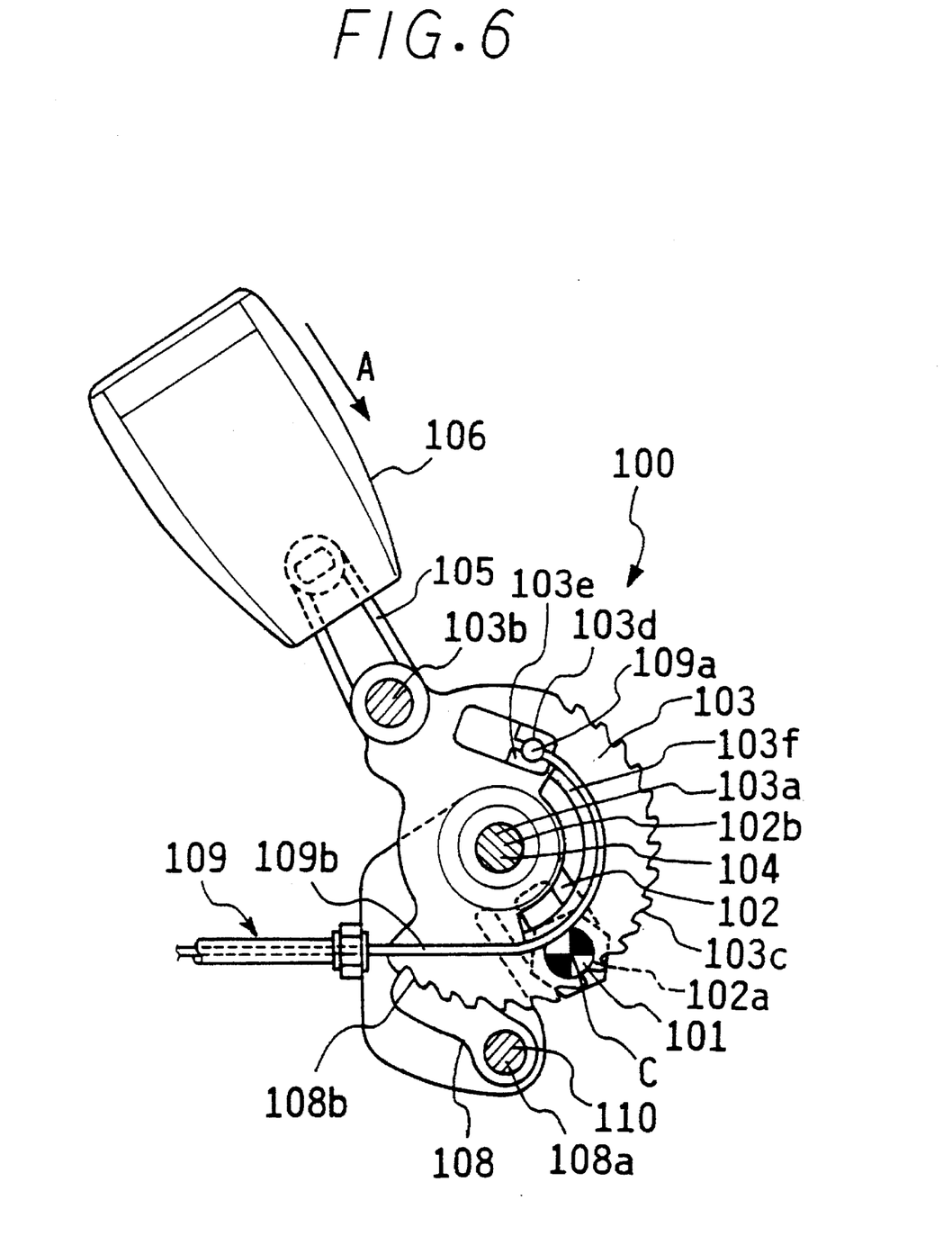
FIG. 6 is a front view of a reversing-prevention mechanism of a tensioning device according to a second embodiment of the present invention.
Figure 7:
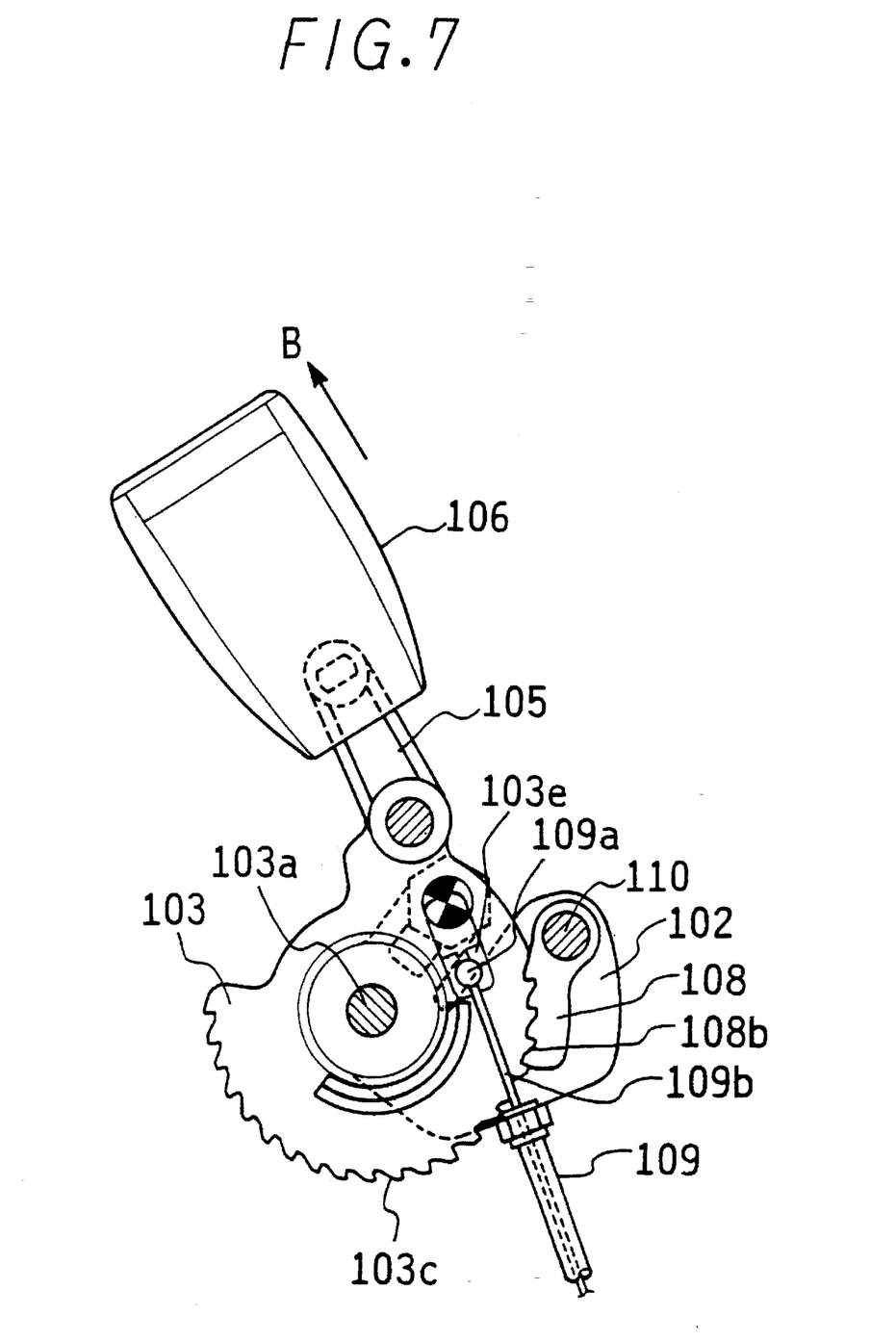
FIG. 7 is a front view indicating the operation of a reversing-prevention mechanism of a tensioning device.

In FIG. 6, a reversing-prevention portion 100 is installed by a bolt 101 at an anchor point C with respect to a frame member 20 structuring a seat S. An arm plate 102 is installed freely rotatably at the center of the bolt 101 axis by means of the bolt 101. A reversing-prevention hook plate 103 having a plurality of hook portions 103c at an outer periphery thereof is installed freely rotatably by means of a rivet 104 at a center portion 103a on one end portion 102a of the arm plate 102. At one end portion 103b of an outer periphery of the reversing-prevention hook plate 103, a seat belt buckle 106 is interconnected via a concluding member 105 joined freely rotatably hereat. A reversing-prevention claw 108 is disposed between the arm plate 102 and a reversing-prevention hook plate support member not illustrated by means of a rivet 110 freely rotatably at a rotational center 108a, and a claw portion 108b thereof is engaged with a hook portion 103c of the foregoing reversing-prevention hook plate 103. A protruding portion 103e having a hole portion 103d which is engaged by a tip portion 109a of an interconnecting member 109 connecting a tensioning mechanism similar to that of the first embodiment is provided at the reversing-prevention hook plate 103, and is engaged with the tip portion 109a of the interconnecting member 109. Additionally, a guide portion 103f which winds an inner wire 109b of the interconnecting member 109 on the reversing-prevention hook plate 103 is disposed on the reversing-prevention hook plate 103.

A mode of operation will be described hereinafter.

In an initial state, as shown in FIG. 6, the arm plate 102 is not pulled by means of the interconnecting member 109, and so the seat belt buckle 106 is in an untensioned state. In this state, if more than a predetermined deceleration inertial force acts upon the vehicle and the inner wire 109b is pulled by the tensioning mechanism not illustrated, the protruding portion 103e having the hole portion 103d with which the tip portion 109a is engaged rotates clockwise with the center portion 103a as the rotational center, and in accompaniment with this the reversing-prevention hook plate 103 also begins to rotate clockwise. In accompaniment with the clockwise rotation of the reversing-prevention hook plate 103, the claw portion 108b of the reversing-prevention claw 108 supported freely rotatably between the arm plate 102 and the reversing-prevention hook plate support member by means of the rivet 110 with the rotational center 108a as a center repeats the engagement and engagement release with the hook portion 103c of the reversing-prevention hook plate 103 while rocking with the rotational center 108a as the center. Additionally, simultaneously with this clockwise rotation of the reversing-prevention hook plate 103, the arm plate 102 begins to rotate counterclockwise with the anchor point C as the rotational center. By means of the counterclockwise rotation of the arm plate 102, the reversing-prevention hook plate support member and the reversing-prevention hook plate 103 installed on another end portion 102b by means of the rivet 104 also rotate counterclockwise with the anchor point C as the rotational center. By means of this clockwise rotation of the reversing-prevention hook plate 103 and the start of the counterclockwise rotation of the arm plate 102, the seat belt buckle 106 concluded integrally via the concluding member 105 at an outer peripheral portion 103b of the reversing-prevention hook plate 103 begins linear movement essentially in the direction of arrow A. If the inner wire 109b of the interconnecting member 109 is further pulled by means of tensioning mechanism, the reversing-prevention hook plate 103 rotates greatly clockwise and the arm plate 102 rotates greatly counterclockwise, the seat belt buckle 106 further moves greatly and substantially linearly in the direction of arrow A (FIG. 7). Even if the tensioning of the inner wire 109b by means of the tensioning mechanism is completed and thereafter the seat belt buckle 106 attempts to return in the direction of arrow B due to load applied to the seat belt by means of forward movement of the rider, the reversing-prevention hook plate 103 is engaged with the claw portion 108b of the reversing-prevention claw 108 at the hook portion 103c, and so counterclockwise rotation of the reversing-prevention hook plate 103 and clockwise rotation of the arm plate 102 are blocked and the attempt of the seat belt buckle 106 to return in the direction of arrow B is blocked.

(Third Embodiment)

Figure 8:
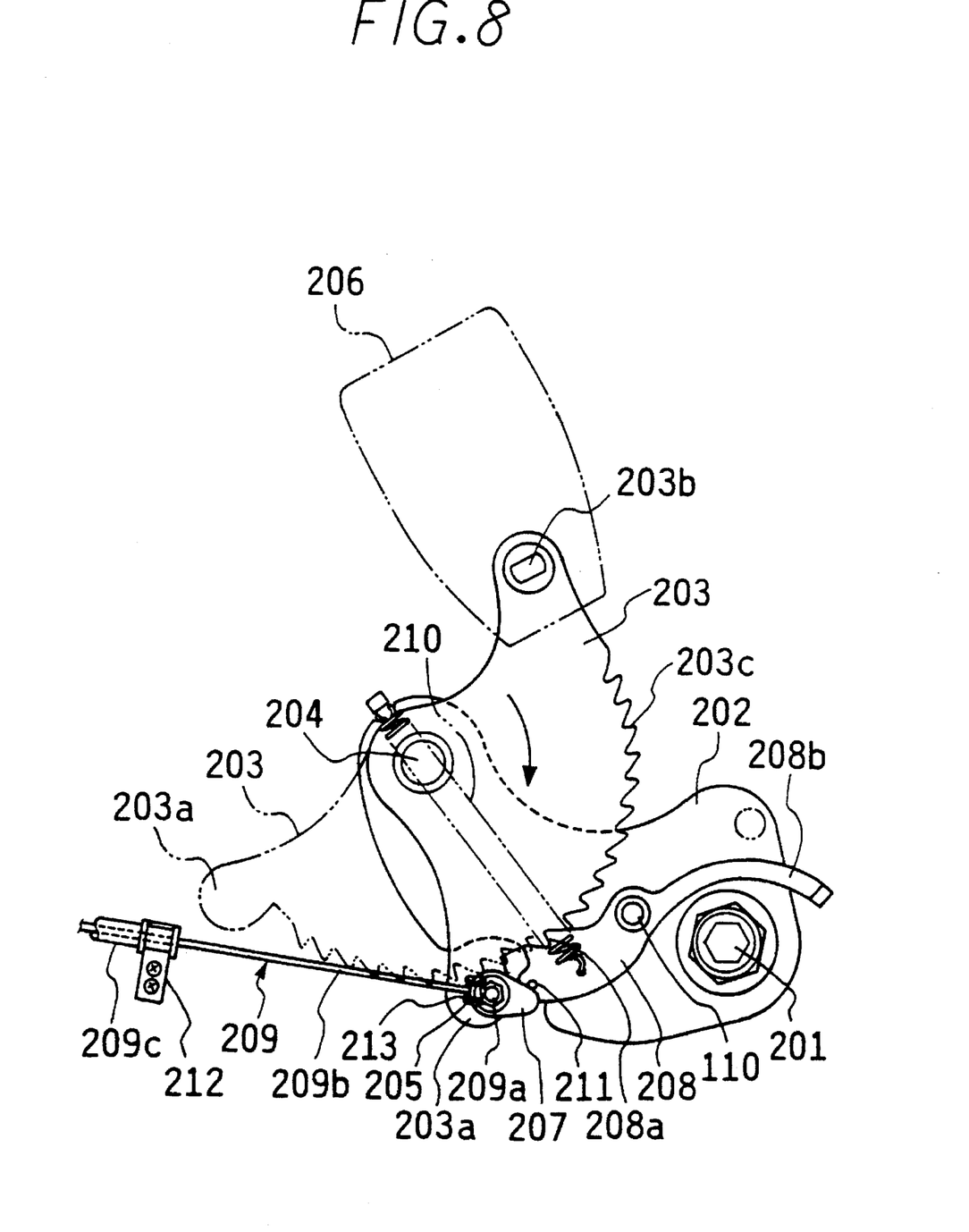
FIG. 8 is a front view of a reversing-prevention mechanism of a pre-tensioning device according to a third embodiment of the present invention.

In FIG. 8, a base end of a stay 202 is fixed by means of a bolt 201 to a frame member (FIG. 1) structuring a vehicle seat S, and is integral with a frame member 20 which is a base body. A tip of the stay 202 is somewhat curved and extends diagonally upwardly, and a reversing-prevention hook plate 203 is joined freely rotatably to this tip portion by means of a rivet 204. The reversing-prevention hook plate 203 constitutes an abbreviated fan configuration; a center thereof is interconnected with the stay 202 by the foregoing rivet 204, and along with this a multiplicity of hook portions 203c are formed on an outer periphery.

A seat belt buckle 206 is joined freely rotatably to one end portion 203b positioned on an upper area of the foregoing reversing-prevention hook plate 203, and along with this a tip of an inner wire 209b of an interconnecting member 209 reaches to another end portion 203a. A slot 205 is formed in the foregoing other end portion 203a, a restraining tab 207 is mounted freely longitudinally movably thereat, and the tip of the foregoing interconnecting member 209 is fixed to the restraining tab 207. The restraining tab 207 is urged from behind by means of a spring member 213 provided within the slot 205 and protrudes forwardly (the rightward direction of the drawing). Moreover, a flexible outer case 209c of the interconnecting member 209 is fixed to the frame member 20 (see FIG. 1) or the like by means of a clip 212.

A reversing-prevention claw 208 is joined freely rotatably at the center of the foregoing stay 202 by a rivet 110. A claw portion 208a is formed on a side surface of a tip portion on the reversing-prevention claw 208 and is engaged with an outer peripheral hook portion 203c of the reversing-prevention hook plate 203. The plate thickness of the foregoing reversing-prevention claw 208 is made greater than the plate thickness of the reversing-prevention hook plate 203, and there is no disengagement of the two even if torsion or the like is generated at the reversing-prevention claw 208. A base end of the foregoing reversing-prevention claw 208 curves and extends over the stay 202 to become an operating portion 208b. The reversing-prevention claw 208 is urged toward an outer peripheral surface of the reversing-prevention hook plate 203 by means of a coil spring provided by means of a plate surface thereof and the tip portion of the stay 202. Additionally, in the illustrated state wherein the inner wire 209b is not tensioned and operated by means of a tensioning mechanism not illustrated, a pin disposed protrudingly on the tip plate surface of the reversing-prevention claw 208 contacts a tip side surface of the foregoing restraining tab 207 in a protruding state, and movement away from the reversing-prevention hook plate 203 is prevented. Consequently, even if the seat belt buckle 206 is pressed downwardly in this state, the reversing-prevention hook plate 203 does not rotate.

According to this structure, if deceleration of the vehicle is applied and the inner wire 209b is pulled by means of the tensioning mechanism, the restraining tab 207 retracts and along with this the reversing-prevention hook plate 203 is pulled by the inner wire 209b and rotates in the direction of the arrow indicated in the drawing. In accompaniment with this rotation, the seat belt buckle 206 moves diagonally upwardly, i.e., in the direction of tensioning action from the seat belt, from the most proximate illustrated position to turn and move downwardly together with the reversing-prevention hook plate 203, and the seat belt is pre-tensioned. During this rotation of the reversing-prevention hook plate 203, the claw portion 208a of the reversing-prevention claw 208 successively rides over the arriving hook portions 203c of the reversing-prevention hook plate 203, with no engagement. Because the range of rotation of the reversing-prevention hook plate 203 is established so that the other end 203a thereof does not go upwardly from the rivet 204, the problem wherein the body of the rider touches the reversing-prevention hook plate 203 during rebound after seat belt pre-tensioning does not occur.

Even if pulling force is applied to the seat belt buckle 206 accompanying forward movement of the rider body after the completion of tensioning, in this case the claw portion 208a of the reversing-prevention claw 208 engages with the hook portion 203c and reverse rotation of the reversing-prevention hook plate 203 is prevented. In a case wherein the seat belt buckle 206 is caused to return to the origin point and the device is reset, it becomes possible to cause the reversing-prevention hook plate 203 to rotate in reverse by means of pinching the operating portion 208b of the reversing-prevention claw 208 and releasing the engagement of the claw portion 208a and hook portion 203c.

According to the present embodiment, although the path during tensioning of the seat belt buckle is somewhat curves, movable portions are reduced and strength is improved, and along with this, structure is also simplified. Moreover, it is also acceptable to join the reversing-prevention hook plate directly to the frame member without providing a stay.

The respective foregoing embodiments were structured to tension a seat belt buckle by means of a pre-tensioning device of a seat belt, but it is also acceptable to structure a retractor of a shoulder belt side or an anchor of a lap belt side.

As described above, in a seat belt pre-tensioning device according to the present invention, a moving member of rod configuration according to the prior art is not utilized in a reversing-prevention mechanism, and so space to cause a seat belt suspension member to be tensioned and move can be made small, and overall compactness of the device as well as simplification of the structure are realized.

What is claimed is:

1. A seat belt tensioning device (50:100) to tension a seat belt when a predetermined deceleration force of a vehicle is exerted, comprising:

a first plate which is freely rotatable at a center of a first rotating shaft fixed on a vehicle;

a second plate which is freely rotatable at a center of a second rotating shaft disposed on said first plate;

a tensioning means disposed in said vehicle for causing a tensioning force;

an interconnecting member one end of which is interconnected with said tensioning means and the other end of which is interconnected with said second plate; and an interconnecting means fixed to said second plate for interconnecting said seat belt;

wherein, when a predetermined deceleration force is exerted, said first and second plates are rotated together by said tensioning force transferred by said interconnecting member so that said seat belt is tensioned.

2. A seat belt tensioning device according to claim 1, wherein said second plate rotates in a direction which is different from a rotational direction of said first plate.

3. A seat belt tensioning device according to claim 1, further comprising:

a rotation restricting member to block rotation in a direction opposite to a direction of rotation due to said tensioning force of said second plate, said rotation restricting member being disposed on one of said first and second plates.

4. A seat belt tensioning device according to claim 3, wherein said rotation restricting member includes a plurality of hook portions disposed on an outer periphery of said second plate and a claw portion engageable and disengageable with said hook portions, said claw portion being disposed to be fluctuating on said first plate.

5. A seat belt pre-tensioning device according to claim 1, further comprising:

a guide member having an arc configuration centered on said second rotating shaft on said second plate to guide said interconnecting member.

6. A seat belt tensioning device to tension a seat belt when a predetermined deceleration force of a vehicle is exerted, comprising:

a first plate fixed on a vehicle;

a second plate which is freely rotatable at a center of a rotating shaft disposed on said first plate;

a tensioning means disposed in said vehicle for causing a tensioning force;

an interconnecting member one end of which is interconnected with said tensioning means and the other end of which is interconnected with said second plate; and an interconnecting means fixed to said second plate for interconnecting said seat belt;

wherein, when a predetermined deceleration force is exerted, said first and second plates are rotated by said tensioning force transferred by said interconnecting member so that said seat belt is tensioned.

7. A seat belt tensioning device according to claim 6, further comprising:

a rotation restricting member to block rotation in a direction opposite to a direction of rotation due to said tensioning force of said second plate, said rotation restricting member being disposed on at least one of said first and second plates.

8. A seat belt tensioning device according to claim 7, wherein said rotation restricting member includes a plurality of hook portions disposed on an outer periphery of said second plate and a claw portion engageable and disengageable with said hook portions, said claw portion being disposed to be fluctuating on said first plate.

9. A seat belt tensioning device according to claim 8, comprising a reversing-prevention means including said claw portion for allowing one way movement of said second plate.

10. A seat belt tensioning device according to claim 9, wherein said reversing-prevention means includes an operating portion to release engagement of said claw portion and said hook portions.

11. A seat belt tensioning device according to claim 6, wherein said first plate is freely rotatable at a center of a rotating shaft so that said first and second plates are rotated together by said tensioning force transferred by said interconnecting member so that Said seat belt is tensioned when a predetermined deceleration force is exerted.

* * * * *